United States Patent [19]

McGuerty

[11] Patent Number: 5,309,701
[45] Date of Patent: May 10, 1994

[54] LAWN MOWER AND EDGER CARRIAGE

[76] Inventor: Frank J. McGuerty, 525 W. El Norte Pkwy. #105, Escondido, Calif. 92026

[21] Appl. No.: 82,720

[22] Filed: Jun. 28, 1993

[51] Int. Cl.$^5$ .................... A01D 34/43; A01D 34/64
[52] U.S. Cl. .................... 56/16.9; 56/16.7; 56/17.1
[58] Field of Search ............. 56/16.7, 16.9, 17.1, 56/17.2, 17.4, 17.5, 12.7, 12.1, 237, 256; 172/13, 14

[56] References Cited

U.S. PATENT DOCUMENTS

| | | | |
|---|---|---|---|
| 3,221,481 | 12/1965 | Mattson et al. | 56/256 |
| 3,803,819 | 4/1974 | Ehrlich | 56/17.1 |
| 4,077,191 | 3/1978 | Pittinger, Sr. et al. | 56/17.2 X |
| 4,182,100 | 1/1980 | Letter | 56/16.9 |
| 4,587,800 | 5/1986 | Jimenez | 56/26.9 |
| 4,936,886 | 6/1990 | Quillen | 56/16.7 |
| 4,949,536 | 8/1990 | Neufeld | 56/256 X |
| 5,092,113 | 3/1992 | Turunen | 56/330 |
| 5,095,687 | 3/1992 | Andrew et al. | 56/12.7 |

OTHER PUBLICATIONS

"Amateur Mechanics-An Electrically Driven Hedge Trimmer," Popular Mechanics, Oct. 1923, p. 635.

Primary Examiner—Thuy M. Bui
Assistant Examiner—James A. Lisehora
Attorney, Agent, or Firm—L. E. Massie

[57] ABSTRACT

A conventional four wheeled lawn motor carriage having a vertically mounted electric motor with flexible cutting, lines attached to the bottom end of the motor axial drive shaft. A Hand lever is attached to the electric motor enabling the electric motor to rotate from a vertical position to a transverse horizontal position wherein the flexible cutting lines rotate in a vertical plane parallel to and outside of the carriage.

1 Claim, 3 Drawing Sheets

LAWN MOWER AND EDGER CARRIAGE

BACKGROUND OF THE INVENTION

1. Field of the Invention

Lawn mowers employing rapidly rotating flexible lines for the cutting operation are rapidly replacing lawn mowers utilizing rotating metal blades. The instant invention relates to a design wherein the rotating flexible lines can be re-orientated to rotate in a vertical plane thus providing for edge cutting or edging as contrasted to rotating in the horizontal field for lawn cutting. In the present invention the rotating flexible lines are powered by an electric motor energized by a self contained storage battery that allows for a much larger cutting range as contrasted to other conventional lawn mowers that employ an extension cord to energize the cutting device.

2. Description of the Prior Art

U.S. Pat. No. 4,587,800, 1986, Jimenez, discloses a sled type lawn mower carriage having a motor enclosed in a housing supported by a support member in a first vertical position in which the attached rotating flexible lines sweep in a horizontal plane and in a second position in which the flexible lines sweep in a substantially vertical plane. It is necessary to remove the motor supporting member and move the motor assembly inorder to change cutting planes. U.S. Pat. No. 5,092,112, 1992, Buckendorf, discloses a wheeled attachment for a grass trimmer which includes a mounting bar having a wheel at each end. The grass trimmer can be rotated to provide either cutting the grass in a horizontal plane or a vertical plane. U.S. Pat. No.4,936,886, 1990, Quillen, discloses a wheel mounted trimmer having a wheel support with a pair of wheels mounted on opposite sides thereof and handle bars extending rearwardly from the support. A gasoline motor attached to the rear end of a drive shaft housing can be rotated to adjust the trimmer head for cutting in a horizontal plane or a position for cutting in a vertical plane.

SUMMARY OF THE INVENTION

The instant invention relates to a conventional four wheeled lawn mower carriage employing an electric motor driven rotating flexible line-type vegetation trimmer mounted thereon. The flexible lines are attached at ninety degrees to the bottom end of the vertical motor drive shaft. Means are provided for rotating the electric motor from a first vertical position, where the flexible lines rotate in a horizontal plane, to a second horizontal position wherein the the flexible lines rotate in a vertical plane. In the horizontal position the rotating flexible lines trim the lawn in a conventional manner. In the vertical position the rotating lines serve as a lawn edger. A vertical support structure mounted on the horizontal surface of the lawn mower carriage supports the electric motor in a vertical configuration. A fore and aft horizontal horizontal bearing shaft mounted to the top of the motor support structure permits the motor to be rotated in the in the transverse plane. Extending upwardly and parallel to the motor is a hand lever which provides for the lawn motor operator to rotate the motor assembly. Structural means are provided to mount, and secure, an electric storage battery on the horizontal surface of the lawn mower carriage.

The design of the instant invention allows the operator to cut and edge a large lawn area without the encumbrance of long extension cords to power the electric motor, to rapidly change from the cutting mode to the edging mode and the advantage of rapidly recharging the battery.

DETAILED DESCRIPTION OF THE PREFERRED EMBODIMENT

Figure 1:
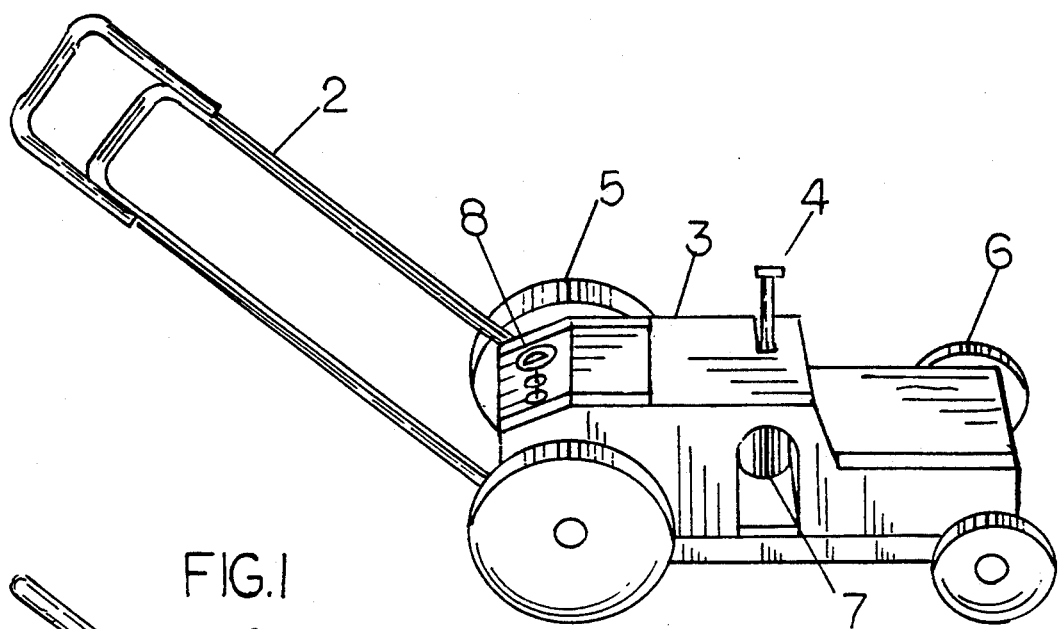
FIG. 1 is a top, left side, perspective view of the lawn mower carriage.

Referring to the drawings there is shown for illustrative purposes only in FIG. 1 the lawn mower carriage 3, the handle assembly 2, attached to a cross bar arranged between the rear wheels 5, and the front wheels 6. the hand lever 4, the electric motor 7 and the instrument panel 8.

Figure 2:
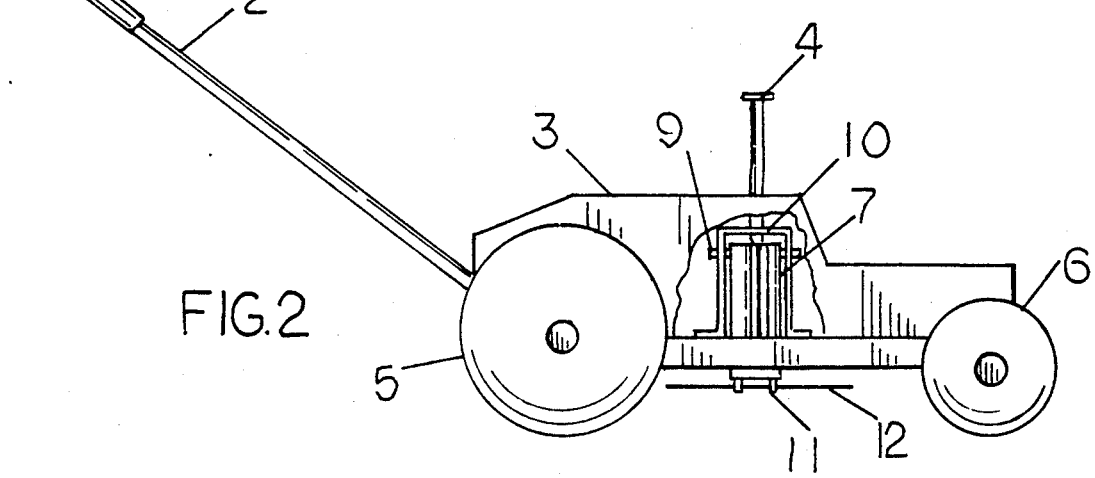
FIG. 2 is a left side elevational view of the lawn mower carriage.
Figure 3:
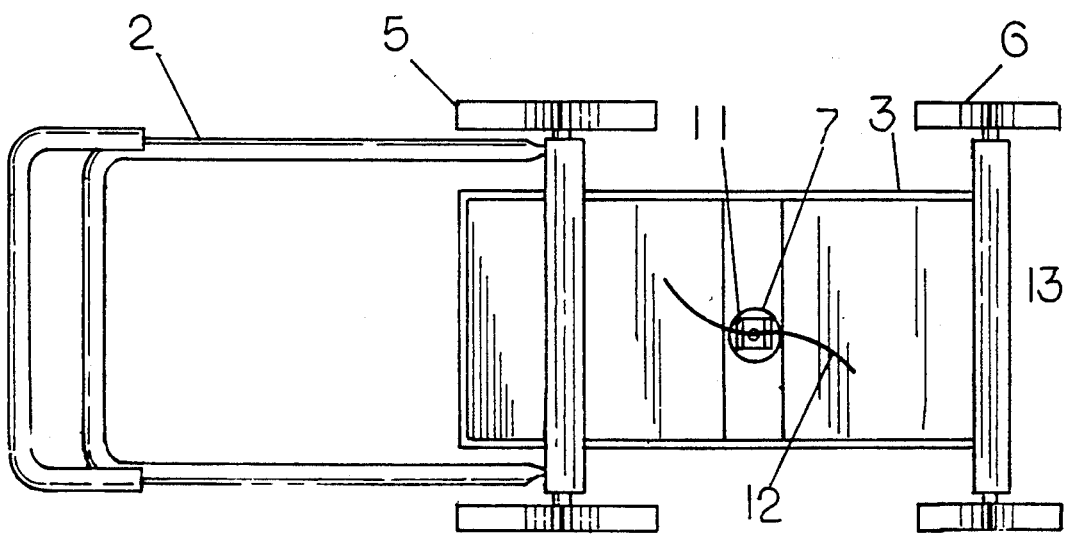
FIG. 3 is a bottom view thereof.

The left side view of FIG. 2 shows the motor support structure 10, the motor 8, the motor rotating shaft 9, the flexible line attachment fixture 11 affixed to the bottom of said shaft, and the flexible line 12.

Figure 4:
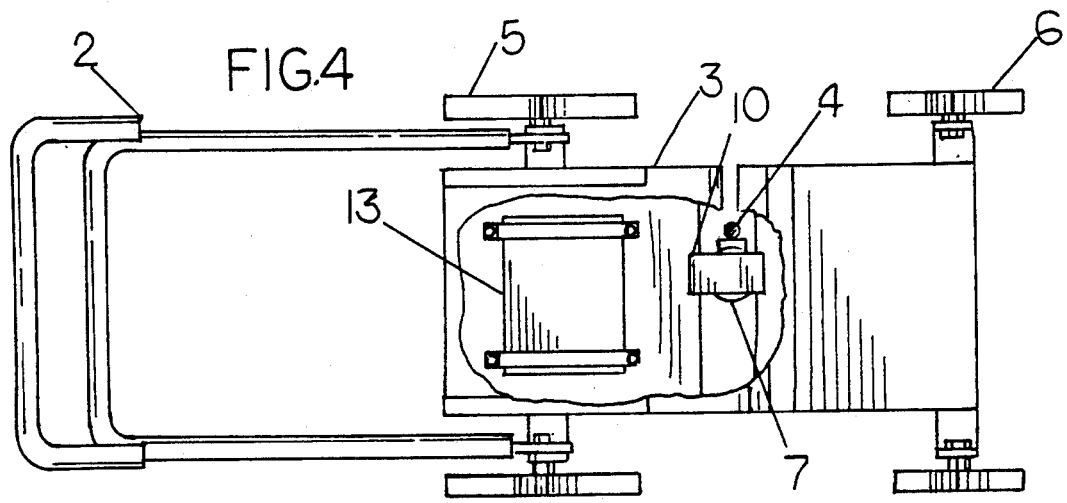
FIG. 4 is a partially sectioned plan view thereof.
Figure 5:
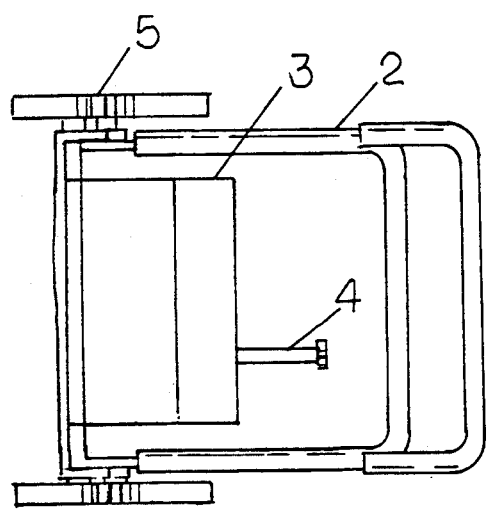
FIG. 5 is a left end view thereof.
Figure 6:
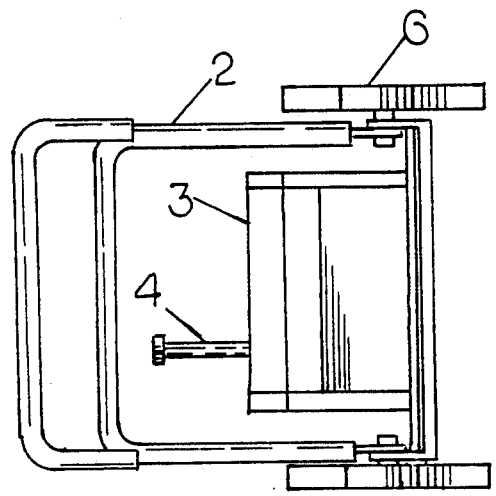
FIG. 6 is a right end view thereof.
Figure 7:
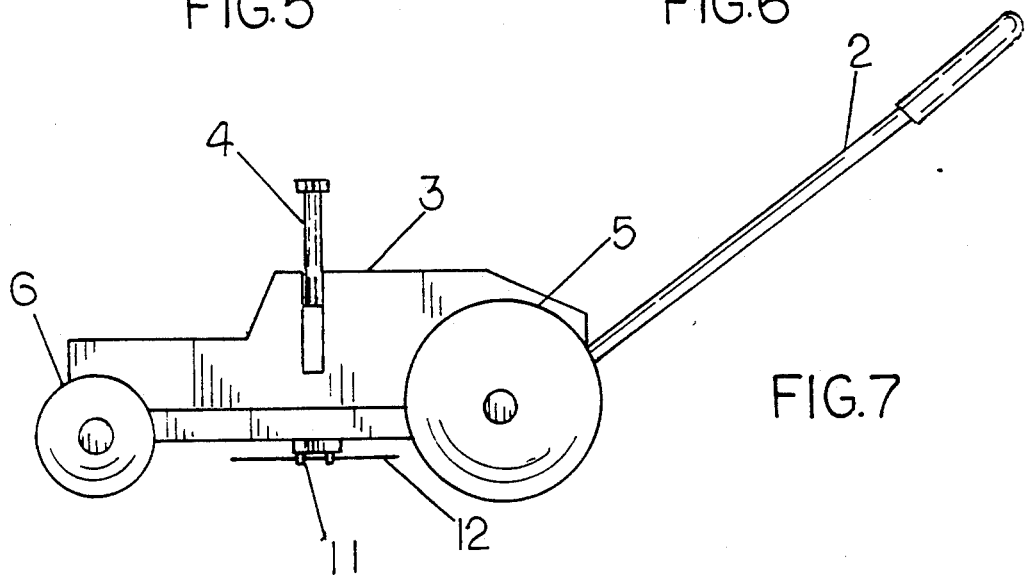
FIG. 7 is a right side elevational view thereof.
Figure 8:
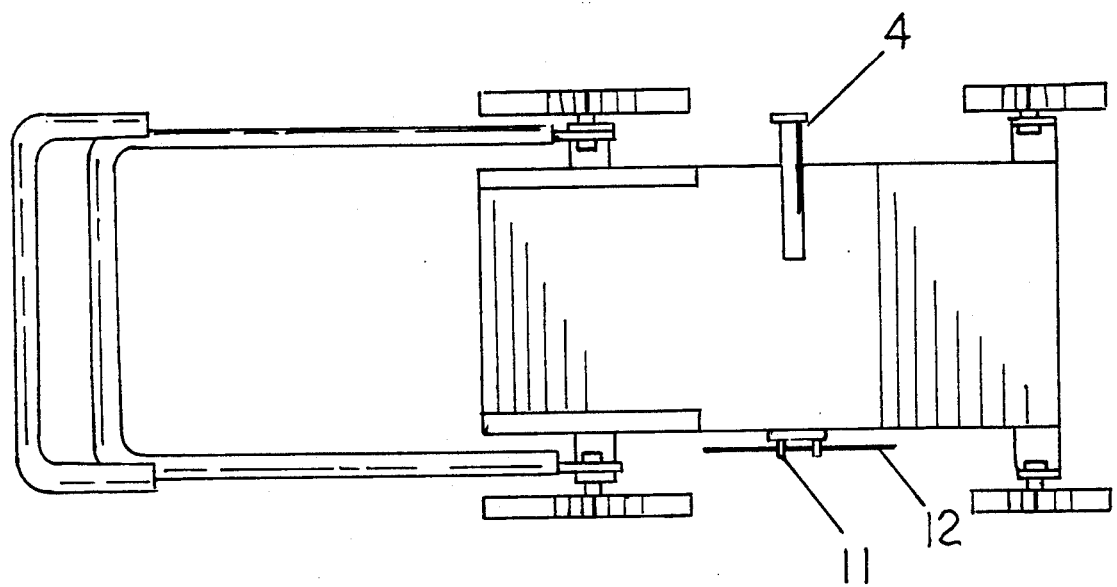
FIG. 8 is a plan view of the mower showing the motor in the horizontal position and the trimmer in a vertical plane.

The partially sectioned view of FIG. 4 show the electric storage battery 13.

Although a preferred embodiment of the invention is disclosed many possible embodiments can be made without departing from the scope of the invention. All matter herein set forth is to be interpreted as illustrative and not in a limiting sense.

I claim:

1. A wheeled lawn mower having an electric motor, powered by a storage battery, with rotating flexible cutting lines affixed thereto wherein the improvements comprise:
    (a), a substantially rectangular lawn mower carriage supported by four wheels;
    (b), a cross bar arranged between two of said wheels and having a handle bar assembly extending rearwardly and upwardly therefrom;
    (c), a motor support structure having a horizontal pivot axis centrally located on said carriage;
    (d), said motor support structure pivotally supporting a motor thereon, said motor being rotatable about said horizontal pivot axis from a vertical position to a transverse horizontal position;
    (e), said motor having an axial power shaft extending away from said motor and terminating at an end remote from the motor;
    (f), a flexible line attachment fixture on said end; and,
    (g), a hand lever, mounted on said motor parallel to said axial power shaft, extending in a direction opposite from said end of said power shaft, said hand lever being operable to rotate said motor from said vertical position to said transverse horizontal position.

* * * * *